J. J. ANDERSON.
TWINE CUTTER.
APPLICATION FILED SEPT. 18, 1911.
1,020,788.
Patented Mar. 19, 1912.
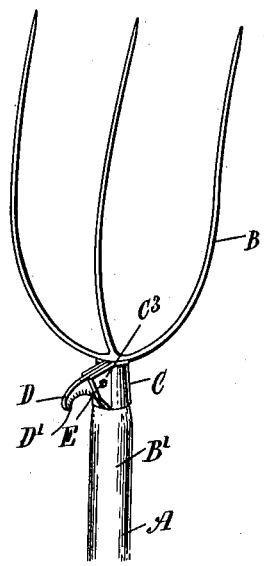
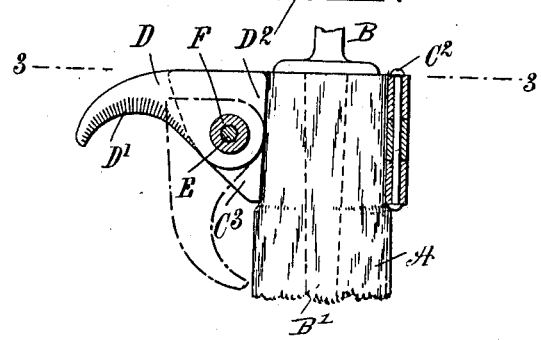
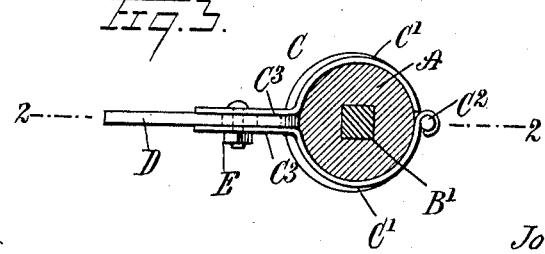
WITNESSES
INVENTOR
John J Anderson
BY
ATTORNEYS

UNITED STATES PATENT OFFICE.

JOHN J. ANDERSON, OF FRANKLIN, MINNESOTA.

TWINE-CUTTER.

1,020,788.

Specification of Letters Patent. Patented Mar. 19, 1912.

Application filed September 18, 1911. Serial No. 649,798.

*To all whom it may concern:*

Be it known that I, JOHN J. ANDERSON, a citizen of the United States, and a resident of Franklin, in the county of Renville and State of Minnesota, have invented a new and Improved Twine-Cutter, of which the following is a full, clear, and exact description.

The object of the invention is to provide a new and improved twine cutter for use on a pitchfork or a like agricultural implement to permit of conveniently cutting the twine or band used for binding a sheaf, corn shock or the like.

For the purpose mentioned use is made of a cutter blade attached to the ferrule of a pitchfork.

A practical embodiment of the invention is represented in the accompanying drawings forming a part of this specification, in which similar characters of reference indicate corresponding parts in all the views.

Figure 1 is a perspective view of a pitchfork provided with a twine cutter; Fig. 2 is an enlarged sectional side elevation of the same, the section being on the line 2—2 of Fig. 3; and Fig. 3 is a section of the same taken along the line 3—3 in Fig. 2.

The handle A of a pitchfork, or a similar agricultural implement, is engaged at one end by the tang B' of prongs B, and the tang B' is bound in place by a ferrule C surrounding the terminal of the handle A and carrying a twine cutter D for cutting the twine or band used for binding a sheaf, corn shock or the like to permit the user to readily distribute the grain material or fodder for feeding cattle or for other purposes.

The ferrule C is preferably made in two sections C', C' pivotally connected with each other at C² and provided at their free ends with flanges C³ extending parallel one relative to the other and spaced apart for the reception of the blade of the cutter D, as plainly indicated in the drawings. A bolt, rivet, or a similar fastening device, extends transversely through the flanges C³ and through a bushing F held in the cutter D to fasten the parts together.

The cutter D is preferably provided with a hook-shaped cutting edge D' extending a distance from the ferrule C and toward the outer end of the handle A, so that the user of the pitchfork can readily engage the cutting edge D' with the twine or band to cut the same by exerting a pull on the handle A after engaging the cutting edge D' with the twine or band.

In order to hold the cutter D against movement, the heel D² thereof abuts against the handle A, as plainly indicated in Fig. 2, and hence the cutter D is not liable to turn on the bushing F during the cutting operation.

From the foregoing it will be seen that the ferrule C can be readily placed in position on the handle A, and the cutter D can be attached to the ferrule by the same means which are employed for holding the hinged members C' of the ferrule C in a closed position.

The cutter D can be swung into a closed position, as indicated in dotted lines in Fig. 2, whenever it is desired to use the pitchfork only for pitching purposes.

Having thus described my invention, I claim as new and desire to secure by Letters Patent:

1. The combination with a fork, of a ferrule attached to the handle adjacent to the prongs thereof and provided with parallel flanges, and a cutter pivoted between the flanges of the ferrule to project at right angles from the handle with the cutting edge of its blade in direction of the outer end of the said handle, the heel of the blade having a straight portion engaging the handle to hold the blade in operative position and a rounded portion concentric with the pivot to permit the cutter to be folded longitudinally of the handle into inoperative position.

2. In combination, a forked handle, prongs attached to the handle, a ferrule engaging the handle at the inner end thereof, the ferrule being made in sections hinged together and provided at their free ends with parallel flanges, a hook-shaped cutter provided with a heel having a straight portion and a rounded portion and extending between the flanges with its straight portion abutting against the handle and the blade projecting therefrom with its cutting edge in direction of the outer end of the handle, and a bolt passing through the flanges and heel of the cutter, the rounded portion of the heel being concentric to the pivot to permit the cutter to be folded to lie longitudinally of the handle out of operative position.

In testimony whereof I have signed my name to this specification in the presence of two subscribing witnesses.

JOHN J. ANDERSON.

Witnesses:
ANDREW J. OLIN,
O. A. OLSON.